Dec. 22, 1970    C. C. EAGLESFIELD ET AL    3,549,233

WAVEGUIDE FOR ELECTROMAGNETIC WAVES

Filed Sept. 20, 1967

CHARLES CECIL EAGLESFIELD *Inventors*
CHARLES KUEN KAO

By *Attorney*

United States Patent Office 3,549,233
Patented Dec. 22, 1970

3,549,233
WAVEGUIDE FOR ELECTROMAGNETIC WAVES
Charles Cecil Eaglesfield and Charles Kuen Kao, Harlow, England, assignors to International Standard Electric Corporation, New York, N.Y., a corporation of Delaware
Filed Sept. 20, 1967, Ser. No. 669,095
Claims priority, application Great Britain, Oct. 18, 1966, 46,448/66
Int. Cl. G02b 5/14
U.S. Cl. 350—96      2 Claims

ABSTRACT OF THE DISCLOSURE

A well known form of waveguide consists of a dielectric core surrounded by a dielectric sheath, the core having a higher dielectric constant than the sheath. In general the core-sheath combination permits energy to flow in a number of core modes, each with its characteristic velocity. It is generally desirably to restrict the number of modes at which energy can flow, which is achieved by choosing a small core diameter. However, the restriction may be nullified by the sheath modes which exist due to finite diameter of the sheath. The present invention includes two sheaths around a core. The outer sheath is rather thin and of the same refractive index as the inner sheath. However, the outer sheath is more opaque than the inner sheath. In this manner, two sets of modes of energy propagation exist.

---

Figure 1:
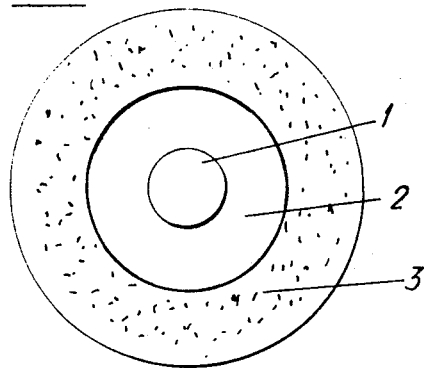

This invention relates to dielectric waveguides for the transmission of electromagnetic energy. Such waveguides are commonly used at optical or microwave frequencies.

It is known to make a dielectric guide for the transmission of electromagnetic energy consisting of a core of transparent dielectric surrounded by a sheath of transparent dielectric of lower refractive index than the core. The guiding is due to total internal reflection at the interface between core and sheath. This does not imply that the energy is entirely contained within the core since with total internal reflection the field penetrates a small distance into the medium of lower index. Here the field extends into the sheath but falls rapidly with radius and is negligible beyond a small radial distance from the core.

It is desirable, when the guide is used for transmitting information, to restrict the number of modes in which the energy can flow since, in general, each mode has a different velocity and the information will arrive at the far end of the guide at different times for each mode. The preferred way to avoid the resulting confusion is to use a guide which permits only a single mode.

This situation is achieved if the diameter of the core is small enough. The critcial diameter for a single mode depends on the jump in refractive index between core and sheath. If the jump is large, the core diameter may be a fraction of a wavelength and the field of the single mode may be effectively confined within a diameter of a few wavelengths. If the jump is small, the core diameter may be a few wavelengths and the field will extend proportionately further into the sheath.

There is always a desire to limit the sheath diameter, whether to reduce the material cost or the occupation of space, or to increase the flexibility. According to the wavelength, one or more of these considerations may be dominant and the perferred compromise may be different.

The sheath diameter must be great enough that virtually all the field of the mode is within it. At millimetre wavelengths, the occupation of space may be the most important consideration and the sheath diameter may be restricted to about 10 wavelengths, requiring that the first case be used, that is a large index jump.

At optical wavelengths, which are so much smaller, a sheath diameter of about 100 wavelengths can be chosen, which fits the second case, a small index jump. This choice has the advantage that the energy is less concentrated over the cross-section, and the guide can carry more energy without undue dielectric stress.

It seems likely that the choice of sheath diameter will generally lie within the range 10–100 wavelengths. Whatexer choice is made it is necessary to consider the influence of the outer surface of the sheath.

If the sheath is surrounded by a medium of lower refractive index, for instance air, total internal reflection will occur and the sheath will itself support modes. These sheath modes will defeat the object of using a single core mode.

If the sheath is surrounded by a medium of higher index, there will be refraction into this outer medium, and the same problem will arise at the surface of the outer medium. There will also be reflection at the interface between the sheath and the outer medium.

According to the invention there is provided a dielectric waveguide for the transmission of electro-magnetic energy including a solid cylindrical core of transparent dielectric material, an inner cylindrical sheath of transparent dielectric material in intimate contact with the core and of lower refractive index than the core, and an outer cylindrical sheath of dielectric material in intimate contact with the inner sheath, the outer sheath having the same refractive index as the inner sheath and being less transparent than the inner sheath.

It will be understood that in the above description, the term refractive index is used to describe what is more properly described as the real part of the refractive index, since the index is in general complex, with an imaginary component, unually much smaller than the real component, associated with the opacity of the material.

Figure 2:
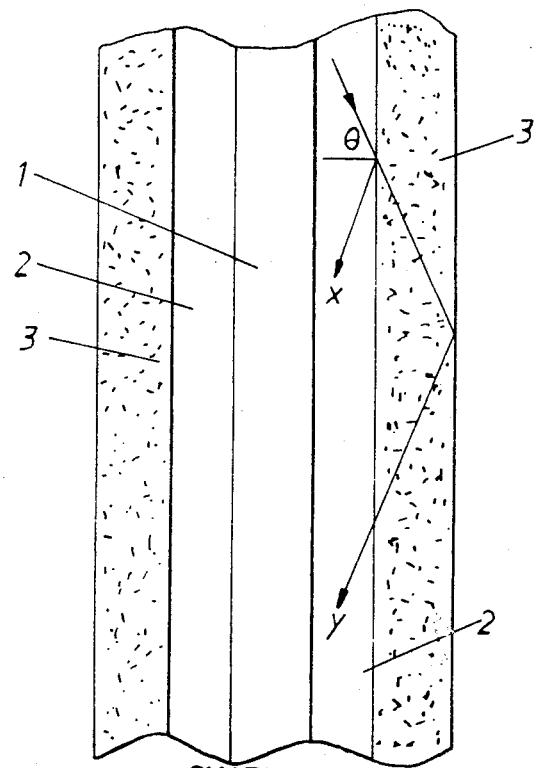

In order that the invention may be more readily understood an embodiment thereof will now be described with reference to the accompanying drawings in which:

FIG. 1 is a diagrammatic cross-section through a cylindrical dielectric waveguide, and FIG. 2 is a diagrammatic longitudinal section through a length of the same guide.

In the example illustrated in the drawings a glass fibre core 1 is surrounded by an inner glass sheath 2, which is in turn surrounded by an outer glass sheath 3. Conveniently the core and the two sheaths are originally large diameter components which are assembled one inside the other. The assembly is then heated until the glasses become ductile, whereupon the concentric assembly is stretched longitudinaly until the drawn out composite fibre is of the required dimensions. The process of drawing out the ductile glass also causes the originally loose fitting sheaths to become a shrink fit on the inner components. The refractive indices of the core and sheaths and the transparency of the outer sheath will depend on the composition of the glasses used.

Consider now the transmission modes in the two sheaths. In fact there will be two such sets of modes.

The first set $x$ arises from reflection at the interface between the inner sheath 2 and outer sheath 3. Because of the equality of refractive index reflection is due only to the change in transparency and is not significant except for those modes for which the incidence on the interface is very near grazing.

If the incidence is less oblique, the wave penetrates into the outer sheath and is totally internally reflected at the outer surface. (It is supposed that the outer sheath is surrounded by air.) This provides the second set of modes $y$.

Both sets of modes are attenuated, the first set by the incomplete reflection and the second set by the double passage through the partially opaque outer sheath. It is evident that the first set will be the more attenuated by making the outer sheath rather transparent whereas the second set will be he more attenuated by making the outer sheath rather opaque. Since either set can be damaging, a compromise opacity should be chosen.

If the outer sheath is made very thick so that even a very small opacity is enough to ensure high attenuation of the second set of modes, by virtue of the long path, then the first set will also be highly attenuated, by virtue of the very small reflection. But this may not be acceptable because, as already discussed, the sheath diameter is restricted and the outer sheath should not unduly increase the overall diameter.

A compromise by which the outer sheath diameter exceeds the sheath diameter by about 10% appears to be suitable.

With this outer sheath thickness, it is possible to choose a compromise opacity which gives the same attenuation for the least attenuated modes of both sets.

The calculation of a suitable opacity for the outer sheath can be made by considering the two sets of modes in greater detail.

FIRST SET OF MODES

These modes arise from reflection at the interface between sheath and outer sheath and are marked $x$ in FIG. 2.

According to whether the wave is polarised with the electric vector lying in the plane of the figure or perpendicular to it, the amplitude reflection coefficients are given by $$\frac{1+R_{11}}{1-R_{11}} = \frac{(n+ik)\cos\theta}{n\cos\theta'} \quad \frac{1+R_1}{1-R_1} = \frac{n\cos\theta}{(n+ik)\cos\theta'}$$

where $$\frac{\sin\theta'}{\sin\theta} = \frac{n}{n+ik} \approx 1-ik$$

and where $R_1$, $R_{11}$ are the amplitude reflection coefficients of the interface between inner sheath and outer sheath, $n+ik$ is the complex refractive index of the outer sheath, $n$ is the refractive index of the inner sheath. $K=k/n$ or the attenuation index (extinction coefficient) of the outer sheath and $\theta$, $\theta'$ are the angles of incidence and refraction at the interface between the inner and outer sheaths. Hence $$\cos\theta' \approx [1-(1-ik)^2 \sin^2\theta]^{1/2}$$
$$\approx [\cos^2\theta + 2ik \sin^2\theta]^{1/2}$$

Since the sheath is assumed only slightly opaque, K has been taken as small in the above.

As remarked previously, the reflection is only significant for near-grazing incidence, that is the $\theta$ approaching $\pi/2$. Hence $\sin\theta$ can be taken as near unity and $\cos\theta$ as small. Moreover, it will be assumed that $\cos^2\theta$ is small compared to 2 K.

This assumption will be discussed later.

Then both $R_{11}$ and $R_1$ are given by $$\frac{1+R}{1-R} \approx \frac{\cos\theta}{\sqrt{2ik}}$$

$$-R \approx 1 - \cos\theta \frac{(1-i)}{K^{1/2}}$$

$$R^2 \approx 1 - \frac{2\cos\theta}{K^{1/2}}$$

and the attenuation per reflection is approximately $$4.34 \times \frac{2\cos\theta}{K^{1/2}} \text{ db}$$

Since the axial distance between reflections (ignoring the effect of the core) is $$d \tan\theta \approx \frac{d}{\cos\theta}$$

where $d$ is the outer diameter of the inner sheath, the attenuation per unit axial length is $$8.68 \frac{\cos^2\theta}{K^{1/2}d} \text{ db}$$

To find the least attenuation of modes of this set, the smallest possible value of $\cos\theta$ must be substituted. Now it is seen above that $R \approx -1$, which is also the case for the TE modes in a hollow circular waveguide with a reflecting metallic boundary. The lowest mode of the set therefore corresponds to the lowest mode of the metallic waveguide, which is $TE_{11}$, and for this mode $$\cos\theta = 1.84 \frac{\lambda}{\pi d}$$

where $\lambda$ is the wavelength as measured in the dielectric. Using this value of $\cos\theta$, the lowest attenuation of the first set of modes is $$3 \frac{\lambda^2}{K^{1/2}d^3} \text{ db/unit axial length} \quad (1)$$

SECOND SET OF MODES

These modes arise from reflection at the surface of the outer sheath and are marked $y$ in FIG. 2.

Assume that the incidence is such that there is virtually complete transmission through the interface between sheath and outer sheath. This approximation is discussed later.

The attenuation per unit length of path in the outer sheath is $$4.34 \times \frac{4\pi K}{\lambda} \text{ db}$$

In one traverse across the guide, the path crosses the thickness of the outer sheath twice and the length of path in the outer sheath is $$2t/\cos\theta$$

where $t$ is the thickness of the outer sheath, and the attenuation per traverse is $$4.34 \times \frac{4\pi K}{\lambda} \times \frac{2t}{\cos\theta} \text{ db}$$

The axial length of one traverse (neglecting the core) is $$(2t+d) \tan\theta$$

and thus the attenuation per unit axial length is $$4.34 \times \frac{4\pi K}{\lambda} \times \frac{2t}{2t+d} \frac{1}{\sin\theta} \text{ db}$$

The lowest attenuation by this formula is got by making $\sin\theta=1$. As discussed later, this is a justifiable approximation. Also, the expression can be simplified if the outer sheath diameter is assumed to exceed the inner sheath diameter by 10%. The lowest attenuation for the second set of modes is then $$5 \frac{K}{\lambda} \text{ db/unit axial length} \quad (2)$$

COMPROMISE ATTENUATION INDEX

If expressions (1) and (2) are equal, that is $$3 \frac{\lambda^2}{K^{1/2}d^3} = 5 \frac{K}{\lambda}$$

then $$K = 0.7 \frac{\lambda^2}{d} \quad (3)$$

is the compromise attenuation index, and the minimum attenuation is $$\frac{3.6}{\lambda} \frac{\lambda^2}{d} \quad (4)$$

For an optical (visible) wavelength of $0.5 \times 10^{-6}$ m., if $d/\lambda=100$ as suggested earlier, the minimum attenuation of the sheath modes is about 700 db/m., by Equation 4, which so far exceeds the attenuation of the core modes that the sheath modes may safely be ignored. (The core mode attenuation is limited by the transparency of available materials; at present about 1 db/m. is available, but it is hoped that materials with 0.01 db/m. may become available later.) Incidentally, in this example, the attenuation of the sheath material (which of course differs from the attenuation of the sheath modes) is about 7,500 db/m., so that a thickness of about 3 mm. or greater would appear visually black.

For a millimetre wavelength of $10^{-3}$ m. say, if $d/\lambda=10$ as suggested earlier, the minimum attenuation of the sheath modes is 35 db/m. For the millimetre wave guide to be attractive, the core mode would need to have an attenuation less than say 0.01 db/m., in which case the sheath modes would be relatively highly attenuated, although with less safety margin than in the optical case. (Presently available dielectrics limit the core mode attenuation to greater than about 1 db/m.)

MATCHING OF REFRACTIVE INDEX

The refractive index of the outer sheath has been assumed equal to that of the inner sheath. The necessary accuracy of matching will now be be considered.

If we write $$\kappa = \frac{\Delta n}{n}$$

for the relative change in index (positive indicating that the outer sheath index is the higher) then if $\kappa$ is negative there is a danger of total internal reflection at the interface. It is therefore safest to specify that $\kappa$ be not negative. For $\kappa$ positive, there will be little effect on the reflection and hence of the attenuation of the first set of modes, provided that $\kappa$ is less than K. The requirement is therefore:

$$0 < \kappa < K$$

(There is in fact a critical negative value of $\kappa$, given by $$1 + \kappa = \sin \theta$$

where $\theta$ is the angle for the lowest mode;
hence $$1 + \kappa = 1 - \tfrac{1}{2}\left(\frac{1.84}{\pi}\frac{\lambda}{d}\right)^2$$

$$\kappa = -\tfrac{1}{4}K)$$

Note that K may be as small as $10^{-4}$ in the optical case and this tolerance on index is feasible with glass. At millimetre waves, K may be $10^{-2}$, and this lower tolerance is feasible with plastics.

Whilst glass appears to be the most suitable medium for the propagation of electromagnetic energy at optical frequencies other materials may commend themselves for use at different frequencies. For example plastics, which can be readily extruded, may provide a satisfactory medium for energy transmission at microwave frequencies. The arts of preparing glasses and other media having particular refractive indices and transparencies are well known and need not be considered in this specification.

It is to be understood that the foregoing description of specific examples of this invention is made by way of example only and is not to be considered as a limitation on its scope.

What we claim is:

1. A dielectric waveguide or the transmission of electromagnetic energy including a solid cylindrical core of transparent dielectric material, an inner cylindrical sheath of transparent dielectric material in intimate contact with the core and of lower refractive index than the core, and an outer cylindrical sheath of dielectric material in intimate contact with the inner sheath, the outer sheath having the same refractive index as the inner sheath and being less transparent than the inner sheath, said outer sheath having an opacity such that the last attenuated modes of each of two sets of modes of electromagnetic wave propagation through the waveguide have approximately the same attenuation, one of said sets being characterized by reflection at the inside diameter of said outer sheath, the other set being characterized by reflection from the outside diameter of said outer sheath.

2. The invention as defined in claim 1, wherein:

$$3 \frac{\lambda^2}{K^{1/2}d^3} = 4.34 \times \frac{4\pi K}{\lambda} \times \frac{2t}{2t-d}$$

where:
$\lambda$ is the wavelength of electromagnetic wave, $K=k/n$,
$k$ is the imaginary component of the refractive index of the outer sheath,
$n$ is the real component of the refractive index of both the inner and outer sheaths,
$d$ is the outside diameter of the inner sheath,
$\pi$ is 3.1416, and
$t$ is the outside thickness of the outer sheath.

References Cited
UNITED STATES PATENTS

| | | | |
|---|---|---|---|
| 3,434,774 | 3/1969 | Miller | 350—96 |
| 3,445,785 | 5/1969 | Koester et al. | 350—96X |
| 3,157,726 | 11/1964 | Hicks et al. | 350—96 |
| 3,350,654 | 10/1967 | Snitzer | (350—96WG)UX |

JOHN K. CORBIN, Primary Examiner